Sept. 27, 1955 W. R. DRESSER 2,718,849

PRINTING STAMPS FOR MAGNETIC TAPE

Filed March 18, 1953

INVENTOR.
WILLIS ROBERT DRESSER

BY
Emery, Varney, Whittemore & Dix
ATTORNEYS

United States Patent Office 2,718,849

Patented Sept. 27, 1955

2,718,849

PRINTING STAMPS FOR MAGNETIC TAPE

Willis Robert Dresser, Long Hill, Conn., assignor to The Vitarama Corporation, Huntington, N. Y., a corporation of New York

Application March 18, 1953, Serial No. 343,176

4 Claims. (Cl. 101—379)

This invention relates to printing stamps and pertains particularly to stamps for printing indicia on magnetic tape.

In the use of magnetic tape it is frequently desirable to print indicia onto the tape which may be read visually, and also to impress a magnetic signal on the tape which may be read electrically.

It is an object of the invention to provide a stamp in which both printed indicia and magnetic signals may be impressed simultaneously, in one operation.

Other objects and advantages of the invention will appear hereinafter.

A preferred embodiment of the invention selected for purposes of illustration is shown in the accompanying drawings, in which, Figure 1 is a perspective view of a handstamp embodying the invention.

Figure 1:
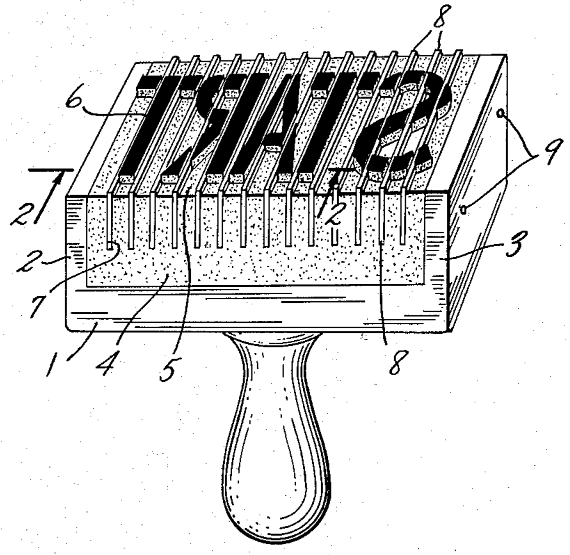
Figure 3:
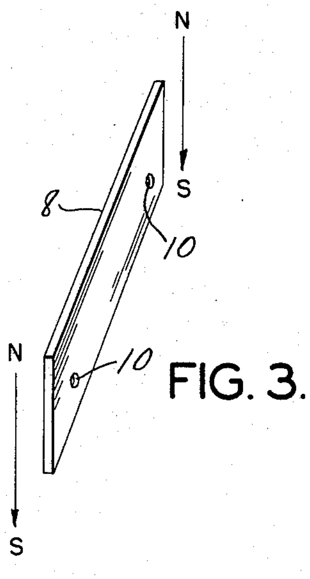
Figure 3 is a perspective view of a magnetized bar.
Figure 2:
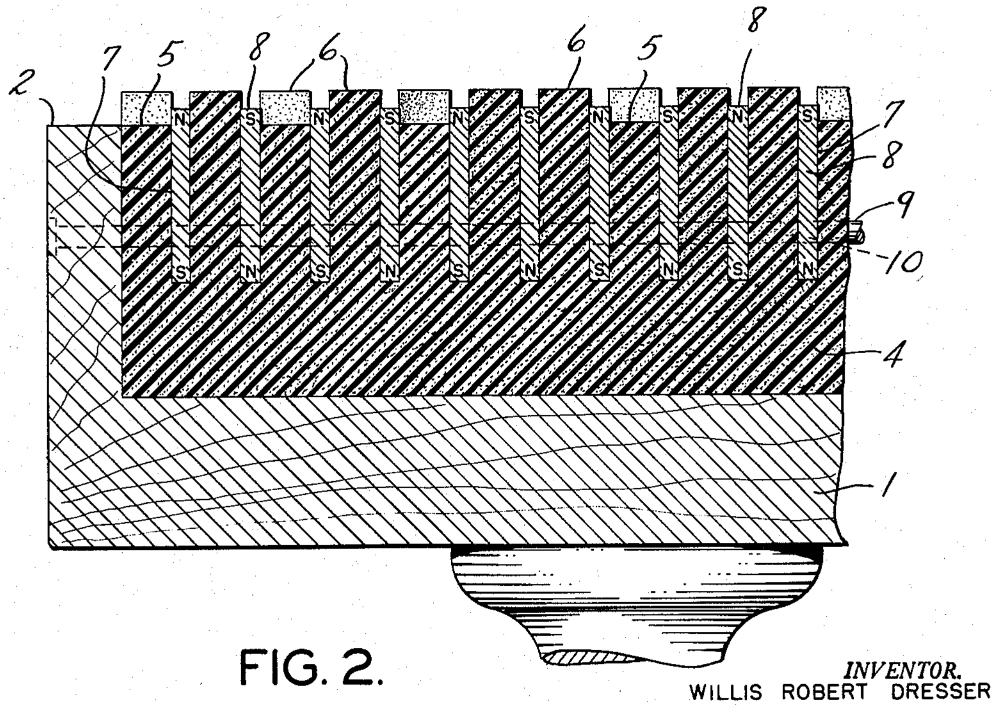
Figure 2 is a section therethrough.

Referring to the drawings, the stamp comprises a suitable frame, here shown as a channel shaped member 1 having end flanges 2, 3. Mounted within the frame between the end flanges is a block 4 of yielding material such as reasonably soft rubber or rubber like material which is commonly used in stamps. The printing surface 5 of said block is provided with raised or embossed printing characters 6 which, when inked, may be used to print on a suitable flat surface in the usual manner. In Figure 1, for example, the letters spelling the word "START" are embossed on the printing surface of the block 4.

Extending transversely across the block 4 are a plurality of spaced slots 7 which receive a series of spaced bars 8 of magnetized iron. Preferably the bars are parallel and are arranged in alternating polarity, that is, with the region of north polarity of one bar opposed to the regions of south polarity of the next adjacent bars. In the preferred embodiment illustrated, the bars are rectangular in shape and one long edge of each bar is of north polarity while the other long edge is of south polarity. Adjacent bars are then arranged with the edge of north polarity of each bar opposite the edge of south polarity of the next adjacent bar, as indicated by the letters N and S.

The bars may be anchored to the frame in any suitable manner, as by pins 9 extending between flanges 2, 3 and passing through apertures 10 in the bars. If the pins 9 are made of iron they increase the magnetic efficiency of the bars by reducing the magnetic reluctance at the bottom edges of the bars. The level of the bars is such that the exposed edges project beyond the printing surface 5 of the block 4 but are slightly below the level of the surfaces of the printing characters 6. Thus, when the stamp is pressed against a piece of magnetic tape, the pressure will ordinarily compress the printing characters into the spaces between the bars while the printing impression is being made, thus allowing the exposed edges of the magnetic bars to contact the tape. This, in turn impresses a magnetic signal on the tape.

It will be understood that the invention may be variously modified and embodied within the scope of the subjoined claims.

I claim as my invention:

1. A stamp for printing indicia on magnetic tape comprising a block of yielding material having a printing surface with raised printing characters thereon, and a bar of magnetized iron extending transversely of said block and having an exposed edge substantially parallel to said printing surface and closely adjacent to but offset below the level of the surfaces of the printing characters so that on compression of said yielding material by engagement with said magnetic tape, said bar may also be caused to engage said tape so that printed indicia and a magnetic signal may be impressed simultaneously on a magnetic tape in a single stamping operation.

2. A stamp as set forth in claim 1 in which a plurality of such bars of magnetized iron extend transversely of said block in spaced, parallel relation, and in which successive bars are arranged in alternating polarity.

3. A stamp as set forth in claim 1 in which a plurality of such bars of magnetized iron extend transversely of said block in spaced, parallel relation, and in which said block is slotted to receive said bars.

4. A stamp as set forth in claim 1 in which a plurality of such bars of magnetized iron extend transversely of said block in spaced parallel relation, in which successive bars are arranged in alternating polarity, and in which said bars are retained by iron pins extending therethrough near the bottom edges thereof which reduce the magnetic reluctance at the bottom edges.

References Cited in the file of this patent

UNITED STATES PATENTS

| | | |
|---|---|---|
| 2,620,731 | Slonnegar | Dec. 9, 1952 |
| 2,632,815 | Crespinel | Mar. 24, 1953 |

FOREIGN PATENTS

| | | |
|---|---|---|
| 264,956 | Great Britain | Feb. 3, 1927 |